United States Patent [19]

Langley, Jr.

[11] 4,370,559

[45] Jan. 25, 1983

[54] SOLAR ENERGY SYSTEM

[76] Inventor: David T. Langley, Jr., c/o 226 S. Main St., Los Angeles, Calif. 90012

[21] Appl. No.: 211,767

[22] Filed: Dec. 1, 1980

[51] Int. Cl.³ ............................................. H01L 31/04
[52] U.S. Cl. ...................................... 290/1 R; 60/398
[58] Field of Search .......................... 60/398; 136/291; 290/42-44, 53-55, 1 R

[56] References Cited

U.S. PATENT DOCUMENTS

| | | | |
|---|---|---|---|
| 4,206,608 | 6/1980 | Bell | 60/398 |
| 4,222,238 | 9/1980 | McCulloch | 60/398 |
| 4,242,593 | 12/1980 | Quilico et al. | 290/42 |
| 4,274,010 | 6/1981 | Lawson-Tancred | 290/44 |

OTHER PUBLICATIONS

Prido; Proceedings Int'l. Photovoltaic Solar Energy Conf.; Published 1978; pp. 1221-1228.

Primary Examiner—J. V. Truhe
Assistant Examiner—Shelley Wade
Attorney, Agent, or Firm—Karl Spivak; M. L. Ajeman

[57] ABSTRACT

A solar energy system is disclosed in which the solar energy is converted to electrical energy for immediate use or the energy may be stored for use at a later date. The solar energy is converted to electrical energy by a large photo-voltaic array and the output of the photo-voltaic array is fed through an inverter and other control circuitry to produce an a.c. electrical output of a predetermined magnitude. The a.c. electrical output may be used directly or the electrical energy may be fed to a storage system for later use. In one embodiment the a.c. electrical energy is employed to drive a pneumatic pump or air compressor for storing the energy in the form of a compressed gas, either in a rigid tank or in a resiliently expandable tank. The compressed air from the tank is released through a control valve and is fed through a pneumatic motor. The pneumatic motor drives an electric generator for producing an a.c. electrical output at the desired times. In another embodiment of the invention, the electrical storage system comprises a system suitable to lift a weight. The potential energy is later converted to kinetic energy by lowering the weight and through a linkage system, is utilized for the generation of electricity through an electric generator.

2 Claims, 2 Drawing Figures

SOLAR ENERGY SYSTEM

BACKGROUND OF THE INVENTION

The present invention relates to a solar energy system and more particularly, relates to a solar energy system in which solar energy derived from the sun may be stored for later use, for example, at times when it is not possible to expose the solar energy collectors to direct sunlight.

The growing demand for energy of all types, including electrical energy, has driven up the price of energy and has placed it at a premium. For various reasons, the search for new sources of energy has not kept pace with the growing demand. In addition, price fixing agreements by foreign oil cartels have greatly increased the price of oil imported from those countries and has also driven up the price of all fossil fuels, even those produced entirely in the United States.

In the past, cheap and plentiful fossil fuels eliminated the necessity of developing solar energy as a substantial source of the energy needs of the country. However, with the dramatic increases in the cost of fossil fuels, and in some cases, the complete lack of such fuels to meet the total demand, other sources of energy have become a necessity. For various reasons, nuclear energy has not, and in all probability will not, completely fill the gap between the demand and supply for energy.

Although it has been known for some time that sunlight or radiation from the sun may be converted into electrical energy by means of various photo-voltaic or solar cells, such as silicon crystals and various thin films, one of the problems in the development and use of solar energy systems has been the fact that the solar energy is not always available. For example, solar energy is not available during the hours of darkness and also may not be available even during the daylight hours where it is heavily overcast or when precipitation exists. Therefore, it is necessary to provide a means of storing the energy derived from the sun during the periods when solar radiation is available in order to provide energy at times when solar energy is not available.

U.S. Pat. No. 3,892,433 discloses a hydro-electric generation plant in which electrical energy generated by a steam turbine driven generator is used to pump water from a low elevation reservoir in the hydroelectric plant to a higher elevation storage reservoir. The steam turbine is driven by steam boiler-super heater which is heated by solar radiation. However, this patent does not disclose a mechanical energy storage system in which solar energy is converted into electrical energy and used to drive an electrical means for storing energy in a mechanical energy system, such as a compressed air system, a combination of compressed air and resilient means system or a gravity energy system.

SUMMARY OF THE INVENTION

The present invention relates generally to the field of energy systems, and more particularly, is directed to a solar energy system coupled with a pneumatic storage means or potential energy storage means.

The solar energy system in accordance with the present invention includes generally an array of solar cells and means to position the array of solar cells in substantially normal alignment to the solar rays. The solar cells feed an inverter and other control circuitry to produce a readily available and immediately usable electrical output. It is contemplated that the electrical energy produced can also be employed to drive an air compressor to feed a compressed gas storage tank, which tank may be of resilient construction.

The compressed gases from the storage tank can then be employed at any time to drive a pneumatic motor for any desired work producing purposes. Alternately the work output capability of the array of solar cells may be utilized to create potential energy of suitable form for future use, for example, by lifting a weight. The potential energy stored in the elevated weight can then be employed to produce a controlled output by utilizing the kinetic energy available as the weight is lowered.

Briefly, in accordance with the present invention, a solar energy system is provided which comprises means for converting solar energy to electrical energy. The solar converting energy means is movably mounted so that it is exposed generally normal to the direction of radiation from the sun. Means is provided for storing energy in a mechanical energy storage system. The solar energy system comprises means for converting the electrical energy output of the solar energy converting means to a mechanical form for storage in the mechanical energy storage system and means for converting the energy stored in the mechanical energy storage system into electrical energy for use at selected times.

It is therefore an object of the present invention to provide an improved solar energy system of the type set forth.

It is another object of the present invention to provide apparatus to enable the use of energy derived from the sun on a continuous basis.

It is another object of the present invention to provide a simplified mechanical or pneumatic system for the storage of solar energy.

It is another object of the present invention to provide a novel solar energy system that is inexpensive in construction, simple in design and trouble-free when in use.

Other objects and a fuller understanding of the invention will be had by referring to the following description and claims of a preferred embodiment thereof, taking in conjunction with the accompanying drawings, wherein like reference characters refer to similar parts through the several views, and in which:

DESCRIPTION OF THE PREFERRED EMBODIMENT OF THE INVENTION

Figure 1:
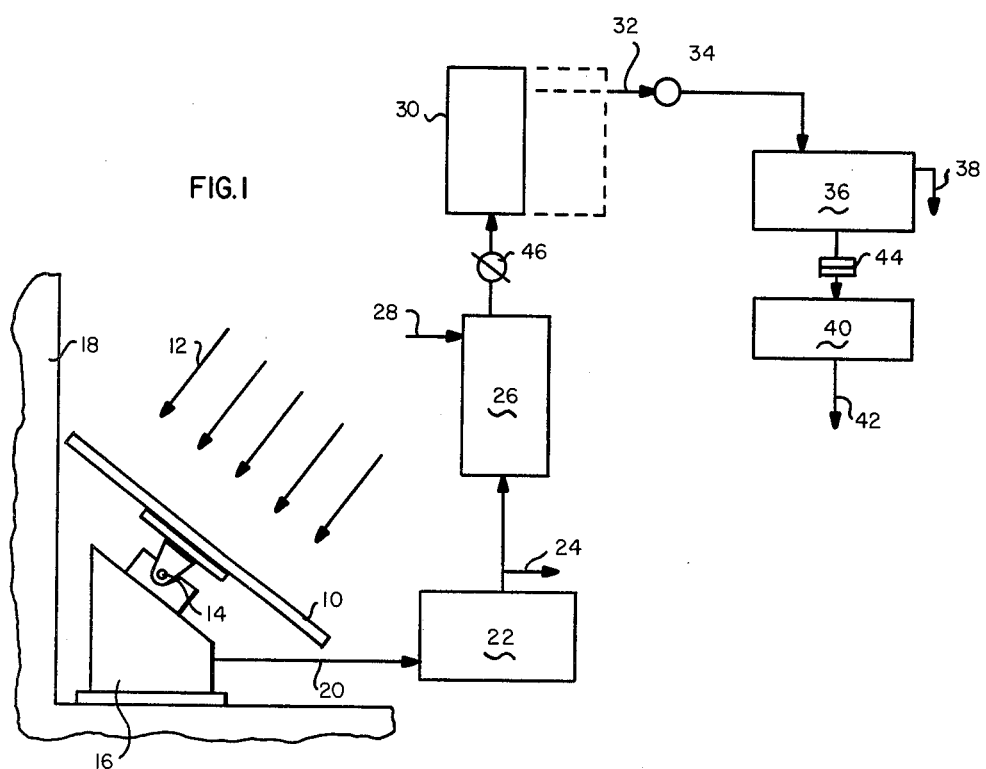
FIG. 1 is a diagrammatic illustration of a solar energy system, including storage capabilities, in accordance with the present invention.

Although specific terms are used in the following description for the sake of clarity, these terms are intended to refer only to the particular structure of the invention selected for illustration in the drawings, and are not intended to define or limit the scope of the invention.

Referring now to FIG. 1, there is shown, a solar cell array or an array of photo-voltaic elements 10 of known design for receiving solar radiation 12. The array of solar cells 10 may be mounted on a suitable plate or structure which preferably is provided with swivel means 14 for maintaining the solar cell array 10 in an optimum direction for collecting solar energy. The swivel means 14 may be equipped with motor means and control means (not shown) in known manner to automatically follow the path of the sun for optimum impingement by the solar rays 12. The array of solar cells 10 is preferably maintained in a direction perpendicular to or normal to the direction of solar radiation 12. The swivel means 14 is mounted on a suitable support means 16 which may be directly mounted upon the surface of the earth or upon a suitable building structure 18, as shown schematically in FIG. 1.

The output of solar cell array 10 is conventionally fed through a cable 20 to an inverter and control circuit 22. Inverter circuit 22 converts the d.c. output of the solar cell array into an d.c. output of appropriate magnitude. Although a preferred embodiment is shown in FIG. 1, it is understood that it would be possible to use the d.c. output of the solar cell array to drive a small d.c. motor or other suitable apparatus (not shown). However, in the preferred embodiment shown in FIG. 1 this current is preferably converted to an a.c. output and is then stepped up in voltage. The output of the inverter circuit 22 may be used by connecting a suitable appliance directly at output terminals 24 or the current may be fed to an electrically driven pneumatic pump or compressor unit 26. The electrically driven pneumatic pump or compressor 26 includes an air inlet 28 and pumps the incoming air at increased pressure into container 30 through the piping 32. A check valve 46 of usual design is provided on the line 32 to prevent the back flow of compressed air.

The container 30 may be a rigid structure for receiving and storing under pressure the output of the pneumatic pump 26. In a preferred embodiment, the container 30 is fabricated of a resilient material, such as rubber or a suitable synthetic resilient material, to provide a predetermined amount of expansion. The energy may therefore be stored in the form of a combination of compressed air from the pump or compressor 26 and the resilient forces of the container 30, itself. It should be noted that other fluids may be also used, for exmaple, substantially incompressible fluids such as water may be employed and the energy being stored would then almost totally be in the expanded resilient material. Also other gases or mixtures of gases may be used as the fluid instead of air.

The output side of the storage container 30 is provided with a control valve 34. When it is desired to use some of the stored energy, the valve 34 can be opened and the compressed air can be caused to flow through a pneumatic motor 36 and then be returned to the atmosphere through the outlet 38. The pneumatic motor 36 is mechanically coupled through a coupling 44 to an electric generator 40. The electric generator 40 provides the desired a.c. current at the desired voltage on the terminal 42 for convenient take off in conventional manner.

Figure 2:
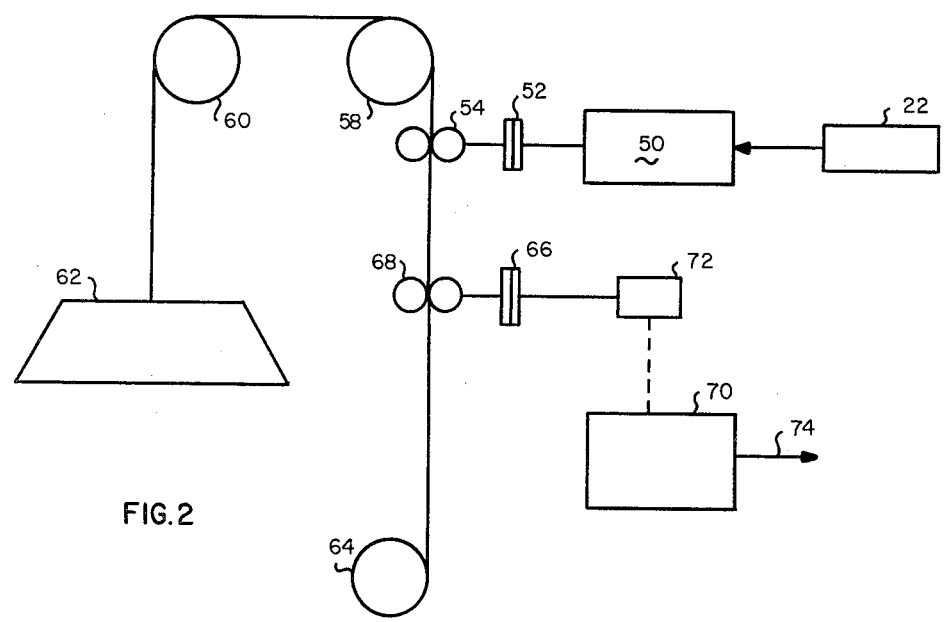
FIG. 2 is a diagrammatic representation of another embodiment of an energy storage means.

Referring now to FIG. 2, there is shown another embodiment of a storage means in accordance with the present invention. The output of the inverter circuit 22 is applied to the input side of a geared electric motor 50 to rotatively drive the motor. The output of geared electric motor 50 is applied through a clutch means 52 to a drive wheel or drive pulley system 54. Preferably, the pulley system 54 includes a sprocket which makes positive driving contact with a chain 56. However, it is understood that a rope or steel cable may be used in place of the chain 56 and friction pulleys could be used in place of the sprocket system 54.

The electric motor 50 has a gearing system which provides a large gear ratio so that the electric motor makes many revolutions for each revolution of the output shaft. This provides great mechanical advantage and a tremendous lifting power on the chain 56 for a relatively small movement. The chain 56 is guided over the pulleys 58 and 60 and is connected to a large weight 62. It should be understood that a large number of weight systems may be used in parallel to produce the desired potential energy storage capabilitites. As the weight 62 is raised, the excess chain 56 at the lower end is taken up by take-up reel 64 in well known manner. If desired, the chain system could also be provided with counterweights in known manner.

When it is desired that the energy in the storage system be used, the clutch mechanism 66 is engaged and clutch mechanism 52 is disengaged. The downward motion of weight 62 causes rotation of the sprocket means 68. Again, the sprocket means 68 may be replaced by friction pulleys (not shown) and the chain 56 may be replaced by a steel cable or rope (also not shown). The downward motion of the weight 62 causes rotation of the electric generator 70 by action of the sprocket means 68, clutch means 66 and gearing 72.

The gearing 72 preferably has a large step-down ratio so that a small movement of chain 56 causes a large number of revolutions of the electric generator 70. A governor mechanism (not shown) may also be provided in the take-up reel 64 or at some other location along chain 56 to provide regulation of the rate of output from the storage system. The electric generator 70 feeds its output voltage to the output terminal 74 is usual manner.

Although the invention has been described with a certain degree of particularity, it is understood that the present disclosure has been made only by way of example and that numerous changes in the details of construction and the combination and arrangement of parts may be resorted to without departing from the scope of the invention.

What is claimed is:

1. A solar energy apparatus, comprising, in combination:
    (a) solar energy means for converting solar energy to electrical energy;
    (b) conversion means operably connected to the solar energy means for converting to mechanical form an energy output of the solar energy means;
    (c) energy storage means operably connected to the conversion means for storing energy in mechanical form received from the conversion means, and forming a potential energy storage facility permitting use of the energy at selected later times, the energy storage means including elevatable, solid weight means for storing potential energy, and clutch means connected to the generator means for permitting the potential energy to be transferred from the weight means to the generator means by downward movement of the weight means, the energy storage means further including a chain connected to the weight means, and sprocket means arranged engaging the chain and operably connected to the generator means and conversion means for alternately moving the chain and being moved selectively by the chain in dependence on which of the generator means and conversion means is being operated, irregular movement of the chain by the sprocket means, through operation of the clutch means of the conversion means, elevating the weight means, and disengagement of the clutch means permitting the weight means to fall at a uniform rate and actuate the generator means; and (d) generator means operably connected to the energy storage means for selectively converting energy stored in the energy storage means from mechanical form into electrical form.

2. Apparatus as defined in claim 1, wherein the solar energy means comprises a geared electric motor, and the solar energy converting means is adjustably mounted for exposure to maximum radiation from the sun.

* * * * *